United States Patent
Lavric (10) Patent No.: US 10,399,058 B2
(45) Date of Patent: Sep. 3, 2019

(54) THERMAL CROSS-TALK RESISTANT FLOW REACTOR

(71) Applicant: CORNING INCORPORATED, Corning, NY (US)

(72) Inventor: Elena Daniela Lavric, Avon (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/580,937

(22) PCT Filed: Jun. 10, 2016

(86) PCT No.: PCT/US2016/036883
§ 371 (c)(1),
(2) Date: Dec. 8, 2017

(87) PCT Pub. No.: WO2016/201221
PCT Pub. Date: Dec. 15, 2016

(65) Prior Publication Data
US 2018/0161747 A1  Jun. 14, 2018

Related U.S. Application Data

(60) Provisional application No. 62/173,612, filed on Jun. 10, 2015.

(51) Int. Cl.
*B01J 19/00* (2006.01)
*F28D 9/00* (2006.01)
(Continued)

(52) U.S. Cl.
CPC ........ *B01J 19/0093* (2013.01); *F28D 9/0037* (2013.01); *F28F 3/12* (2013.01);
(Continued)

(58) Field of Classification Search
CPC .......... B01J 19/0093; B01J 2219/00783; B01J 2219/81; B01J 2219/824; B01J 2219/867;
(Continued)

(56) References Cited

U.S. PATENT DOCUMENTS 3,447,002 A * 5/1969 Ronnevig ................ H02K 1/20
174/DIG. 20
4,583,583 A * 4/1986 Wittel ............... H01M 8/04007
165/46
(Continued)

FOREIGN PATENT DOCUMENTS

EP    2457886 A1   5/2012
WO   2000034728 A1  6/2000

OTHER PUBLICATIONS

International Search Report and Written Opinion of the International Searching Authority; PCT/US2016/036883 dated Aug. 29, 2016; 12 Pages; European Patent Office.
(Continued)

*Primary Examiner* — Joel Attey
(74) *Attorney, Agent, or Firm* — Gregory V. Bean (57) ABSTRACT

A flow reactor has a module (12) that comprises at least first (20), second (30), and third (40) parallel plates stacked temporarily or permanently together and defining a first thermal fluid layer (25) between the first (20) and second plates (30) and a process fluid layer (35) between the second (30) and third plates (40), the process fluid layer (35) comprising a process fluid passage (32) having two or more U-bends and three or more successive process fluid passage segments joined by respective U-bends, the first thermal fluid layer (25) comprising at least two open thermal fluid channels (26) in the second plate (30), the at least two open
(Continued)

channels (26) positioned, when viewed in a plan view of the module (12), between respective adjacent process fluid passage segments.

11 Claims, 4 Drawing Sheets

(51) Int. Cl.
*F28F 13/06* (2006.01)
*F28F 3/12* (2006.01)

(52) U.S. Cl.
CPC ....... *F28F 13/06* (2013.01); *B01J 2219/0081* (2013.01); *B01J 2219/00783* (2013.01); *B01J 2219/00824* (2013.01); *B01J 2219/00867* (2013.01); *B01J 2219/00869* (2013.01); *B01J 2219/00873* (2013.01)

(58) Field of Classification Search
CPC ........... B01J 2219/869; B01J 2219/873; F28D 9/0037; F28F 3/12
USPC .......................................................... 165/168
See application file for complete search history.

(56) References Cited

U.S. PATENT DOCUMENTS

| | | | |
|---|---|---|---|
| 4,828,580 A | 5/1989 | Dach | |
| 5,193,911 A | 3/1993 | Nix et al. | |
| 5,355,382 A | 10/1994 | Kovacs et al. | |
| 5,408,510 A | 4/1995 | Ball et al. | |
| 5,515,316 A | 5/1996 | Yamamoto et al. | |
| 5,690,763 A | 11/1997 | Ashmead et al. | |
| 6,116,022 A | 9/2000 | Woodward | |
| 6,548,027 B1 | 4/2003 | Hall et al. | |
| 6,618,418 B2 | 9/2003 | Northrup et al. | |
| 7,118,917 B2 | 10/2006 | Bergh et al. | |
| 7,357,908 B2 | 4/2008 | Ramani et al. | |
| 7,713,421 B2 | 5/2010 | Galbraith | |
| 7,714,315 B2 | 5/2010 | Happ et al. | |
| 7,771,667 B2 | 8/2010 | Richard et al. | |
| 8,049,198 B2 | 11/2011 | Chang | |
| 8,076,663 B2 | 12/2011 | Liu | |
| 8,161,997 B2 | 4/2012 | Hoglund et al. | |
| 8,503,498 B2 | 8/2013 | Tanaka et al. | |
| 8,534,909 B2 | 9/2013 | Guidat et al. | |
| 8,778,285 B2 | 7/2014 | Hoglund et al. | |
| 8,783,279 B2 | 7/2014 | Williams, Jr. et al. | |
| 8,920,742 B2 | 12/2014 | Noren | |
| 9,073,031 B2 | 7/2015 | Hoglund et al. | |
| 9,278,332 B2 | 3/2016 | Hoglund et al. | |
| 9,558,855 B2 | 1/2017 | Shargots et al. | |
| 9,828,775 B2 | 11/2017 | Senchuk | |
| 9,962,678 B2 | 5/2018 | Roberge et al. | |
| 2002/0101718 A1* | 8/2002 | Negishi ................... | F28F 3/025 361/699 |
| 2004/0173597 A1 | 9/2004 | Agrawal et al. | |
| 2005/0241815 A1 | 11/2005 | Caze et al. | |
| 2010/0081577 A1 | 4/2010 | Sidhu et al. | |
| 2010/0104486 A1 | 4/2010 | Hoysan et al. | |
| 2011/0220332 A1 | 9/2011 | Abenaim | |
| 2012/0122017 A1 | 5/2012 | Mills | |

OTHER PUBLICATIONS

Ke et al; "Single Step Cell LYSIS/PCR Detection of *Escherichia coli* in an Independently Controllable Silicon Microreactor"; Sensors and Actuators B; 120 (2007) p. 538-544.
Kim et al; "A Disposable, Self-Contained PCR Chip"; Lab Chip, vol. 9, No. 4; (2009); p. 606-612.
Muller et al; "Fast Prepatation and Testing Methods Using a Microstructured Modular Reactor for Parallel Gas Phase Catalyst Screening", Catalysis Today; 81 (2003) 377-391.
Muller, "A Modular Approach to Heterogeneous Catalyst Screening in the Laminar Flow Regime", vol. 799 De Fortschritt-Berichte VDI: Reihe 3, Verfahrenstechnik, Verein Deutscher Ingenieure, VDI-Verlag, 2004, ISBN 3183799030, 9783183799039.
Zuo et al; "Micro-Assembled Multi-Chamber Thermal Cycler for Low-Cost Reaction Chip Thermal Multiplexing"; Sensors and Actuators A; 102 (2002) pp. 114-121.
Stoessel, "Thermal Safety of Chemical Processes. Risk Assessment and Process Design", Wiley-VCH Verlag GmbH & Co. KGaA, Weinheim, ISBN: 978-3-527-31712-7 (2008) p. 113.
Hessel et al; "Chemical Micro Process Engineering: Processing and Plants", Wiley, ISBN: 978-3-527-30998-6 (2005) pp. 409-504.
English Translation of CN201680034103.7 First Office Action dated Apr. 16, 2019, China Patent Office, 6 pgs.

* cited by examiner

THERMAL CROSS-TALK RESISTANT FLOW REACTOR

CROSS-REFERENCE TO RELATED APPLICATIONS

This application claims the benefit of priority under 35 U.S.C. § 371 of International Patent Application Serial No. PCT/US2016/036883, filed on Jun. 10, 2016, which in turn, claims the benefit of priority under 35 U.S.C. § 119 of U.S. Provisional Application Ser. No. 62/173,612, filed on Jun. 10, 2015, the content of which is relied upon and incorporated herein by reference in its entirety.

BACKGROUND

The world operates currently through continuous depletion of basic utilities such as energy and freshwater, and sees an ever-increasing cost of raw materials. Thus, it has become increasingly important to improve the sustainability and efficiency of processes of fine chemical and pharmaceutical synthesis. One solution, which enables fewer reagents, less waste materials, high throughput, more efficiency, increased safety and reduced environmental impact, is represented by the use of continuous, small-dimension flow reactors. The use of such continuous-flow devices avoids the drawbacks associated to either conventional "batch" synthesis or scale-up when moving from laboratory to market-size production.

Continuous flow micro-/milli-reactors (reactors having working fluid passage cross-sectional dimensions in the micro- to several milli-meter range) have demonstrated the ability to increase process efficiency due to the intensification of heat and mass transfer processes. The effects on the chemical reactions are beneficial, enabling the reactions to be operated in desirable windows of temperature(s) and concentration(s), thus decreasing the generation of by-products. Furthermore, due to the small in-process volume of continuous flow reactors and their higher controllability, relative to batch reactors, the hazards associated with dangerous chemical processes are considerably reduced.

It is desirable that continuous flow micro-/milli-reactors be thermally stable and very chemically resistant in order to be compatible with the widest possible range of chemicals and reactions. Some ceramic materials—for example, alumina, silicon carbide and aluminium nitride—possess excellent thermal stability and relatively high resistance to a wide range of chemicals. Silicon carbide is especially chemically resistant. Some of these ceramic materials also have relatively high thermal conductivity, as high as some metals, which can be an advantage where high heat transfer rates are needed in the reactor.

High thermal conductivity of the flow reactor can also be a disadvantage however. This is because it is desirable to have as much passage length and passage volume as possible within a given reactor module, which makes it desirable to use a process passage with a folded geometry, while at the same time folded passages are at risk of thermal cross talk, in which a large amount of heat is produced (or absorbed) at one location along the process passage, and the heat spreads (or the cold spot spreads) to other positions along the process passage, with detrimental effects. It would be desirable to be able to use in a flow reactor module a highly chemically resistant material which is also relatively highly thermally conductive, while avoiding or significantly reducing thermal cross talk.

SUMMARY

The present disclosure discloses fluidic modules for a flow reactor and reactors comprising such. According to embodiments, the module comprises at least first, second, and third parallel plates stacked temporarily or permanently together and defining, between the first and second plates, a first thermal fluid layer (with layer in this sense defined as an enclosed volume or passage for the respective fluid, in this case, thermal fluid—but not totally enclosed in the sense that would prevent all flow) and, between the second and third plates, a process fluid layer. Within the process fluid layer between the second and third plates is enclosed a process fluid passage having two or more U-bends and three or more successive process fluid passage segments, the successive process fluid passage segments joined by respective U-bends, each of the three or more successive process fluid passage segments lying adjacent to at least one other of the three or more successive process fluid passage segments. Each successive process fluid passage segment has respective process fluid passage segment centerline. Within the first thermal fluid layer in a surface of the second plate are found at least two first-thermal-layer open thermal fluid channels or open thermal fluid channel segments. Each first-thermal-layer open thermal fluid channel or open thermal fluid channel segment comprises an open top and has a respective channel or channel segment centerline. The respective channel or channel segment centerlines are positioned, when viewed in a plan view of the module, between respective adjacent process fluid passage segment centerlines.

According to further embodiments, the module further comprises a fourth generally planar and parallel plate stacked temporarily or permanently together against the third plate which fourth plate defines together with the third plate, between the third and fourth plates, a second thermal fluid layer. In a surface of the third plate are provided at least two second-thermal-layer open thermal fluid channels or open thermal fluid channel segments. Each second-thermal-layer open thermal fluid channel or open thermal fluid channel segment comprises two sidewalls and an open top, and has a respective channel or channel segment centerline. The respective channel or channel segment centerlines are positioned, when viewed in a plan view of the module, between respective adjacent process fluid passage segment centerlines.

According to further embodiments, in the module according to any of the previous embodiments, at least one of the open thermal fluid channels or open thermal fluid channel segments comprises a straight channel sidewall.

According to further embodiments, in the module according to any of the previous embodiments, at least one of the open thermal fluid channels or open thermal fluid channel segments comprises a wavy channel sidewall. The wavy channel sidewall may, as one option, have a shape complementary to a shape of a respective adjacent process fluid passage segment.

According to further embodiments, in the module according to any of the previous embodiments, at least one of the sidewalls forms an angle of 90° with an associated bottom wall of the same channel.

According to further embodiments, in the module according to any of the previous embodiments, at least one of the sidewalls forms an angle of greater than 90° with an associated bottom wall of the same channel.

According to further embodiments, in the module according to any of the previous embodiments, the module comprises a material having a thermal conductivity of at least 10 W/m·K at 20° C.

According to further embodiments, in the module according to any of the previous embodiments, the module comprises a material having a thermal conductivity of at least 15 W/m·K at 20° C.

According to further embodiments, in the module according to any of the previous embodiments, the module comprises a material having a thermal conductivity of at least 20 W/m·K at 20° C.

According to further embodiments, in the module according to any of the previous embodiments, the module comprises a material having a thermal conductivity of at least 30 W/m·K at 20° C.

According to further embodiments, in the module according to any of the previous embodiments, the module comprises a material having a thermal conductivity of at least 60 W/m·K at 20° C.

According to further embodiments, a reactor comprises two or more modules according to any of the previous embodiments fluidically coupled together.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

In the drawings, relative size, position and dimension are for illustration only and are not to scale. For the purposes of this disclosure, a first thing is considered "adjacent" to a second thing, in the case that the second thing is considered as belonging to a particular category or a particular type or having a particular property, when no third thing falling within the same particular category or a particular type or having the same particular property is positioned between the first thing and the second thing. "Plate" as defined herein refers to either structure as in a plate-like structure or plate-like half of a larger monolithic structure regardless of the fabrication history of the structure, as well as to plate-like structure which forms, by assembly, with temporary or permanent attachment, a part of a larger structure.

Figure 1:
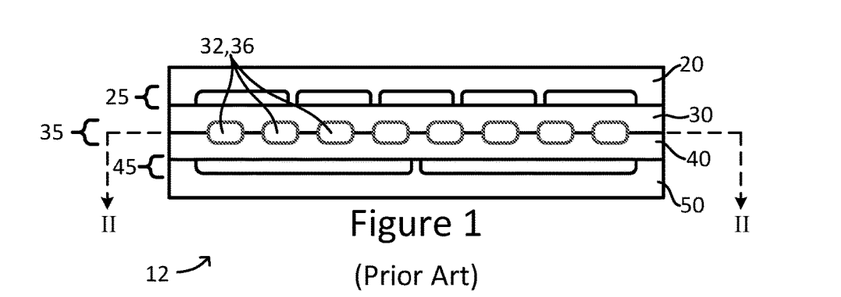
FIG. 1 (Prior Art) is a cross-sectional view of a fluidic module for a flow reactor.
Figure 2:
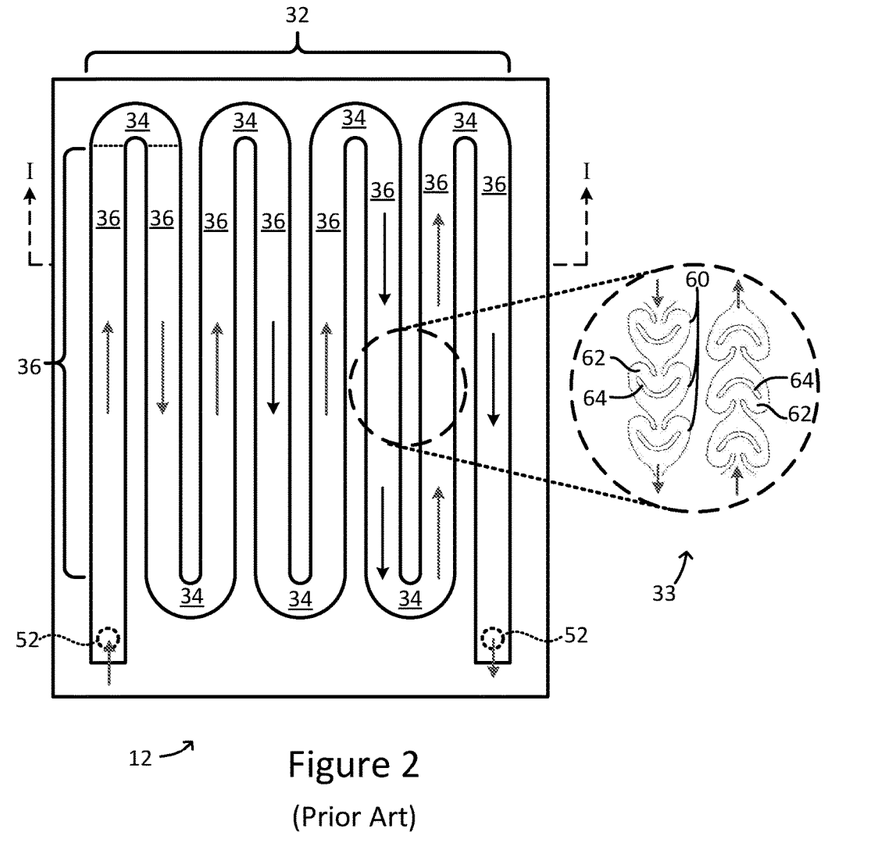
FIG. 2 (Prior Art) is a cross-sectional view of the fluidic module of FIG. 1 taken along the line indicated therein.

FIG. 1 is a cross-sectional view of a prior art fluidic module for a flow reactor. FIG. 2 is a cross-sectional view of the fluidic module (12) of FIG. 1 taken along the line indicated in FIG. 1. With reference to FIGS. 1 and 2, a fluidic module (12) for a flow reactor comprises first, second, third, and fourth parallel plates (20,30,40,50) stacked temporarily or permanently together and defining, between the first and second plates, a first thermal fluid layer (25), and, between the second and third plates, a process fluid layer (35), and, between the third and fourth plates, a second thermal fluid layer (45). Within the process fluid layer (35) between the second and third plates (20,30), a process fluid passage (32), seen best in FIG. 2, has two or more U-bends (34) and three or more successive process fluid passage segments (36), the successive process fluid passage segments (36) joined by respective U-bends (34). Each of the three or more successive process fluid passage segments (36) lies adjacent to at least one other of the three or more successive process fluid passage segments (36). The inset 33 of FIG. 2 shows an alternative embodiment of the segments (36). The segments may have more complexity and structure than the plain channels of the main part of FIG. 2. In the inset 33, portions of two adjacent segments (36) are shown. Each segment includes multiple chambers 60 each including a splitting and re-directing wall 64 which divides the flow path in each chamber 60 into two branches, one of which is branch 62 as indicated in the Figure. Segments having structure such as this can have good mixing (and resulting high mass and heat transfer) all along the passage (32).

However, if the fluidic module (12) is relatively compact such that fluid passage segments (36) are relatively close together, and/or if the second and third plates (30,40) comprise material having a relatively high thermal conductivity (such as 10 or 15 W/m·K at 20° C. or more, for example), then a problem can easily arise in the form of thermal cross-talk between adjacent pairs of process fluid passage segments (36). Volumes of reactant near a reaction-produced hot spot can be heated excessively, even if the distance along the process fluid flow-path from the hot spot is relatively long, by heat diffusion perpendicular to the flow direction(s) in the fluid passage segments (36). Increasing the flow of the thermal fluid can mitigate the problem, but to a limited degree. The result of thermal cross-talk will be, in the best case, nonhomogeneous product. In other cases, exposing closer-to-exit volumes to higher temperatures favors unwanted side products, leading to undesired products which, in certain cases, might be hazardous. The present disclosure provides an elegant way to reduce or eliminate problems caused by thermal cross-talk, without the use of hybrid or exotic materials or particularly difficult fabrication processes.

Figure 3:
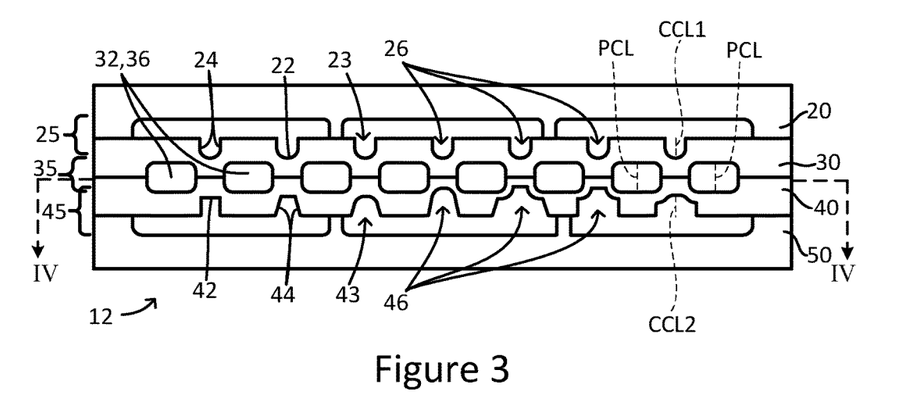
FIG. 3 is a cross-sectional view of the same perspective as FIG. 1, but of an embodiment of a fluidic module according to the present disclosure.
Figure 4:
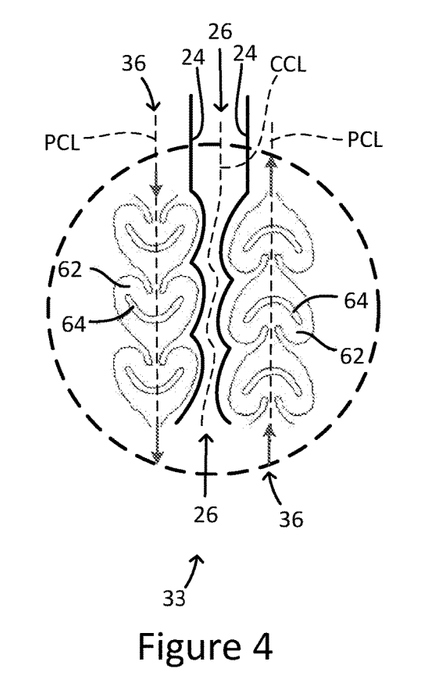
FIG. 4 is a partial plan view of the same perspective (and of the same part) as the inset of FIG. 2, but of an additional embodiment of a fluidic module according to the present disclosure.

FIG. 3 is a cross-sectional view of the same perspective as FIG. 1, but of an embodiment of a fluidic module according to the present disclosure. FIG. 4 is a partial plan view of the same perspective (and of the same part) as the inset of FIG. 2, but of an additional embodiment of a fluidic module according to the present disclosure. With reference to FIGS. 3 and 4, a fluidic module (12) similar to that of FIG. 1 is shown except that in the first thermal fluid layer (25), in a surface (28) of the second plate (30), at least two first-thermal-layer open thermal fluid channels or open thermal fluid channel segments (26) are provided, with each first-thermal-layer open thermal fluid channel or open thermal fluid channel segment (26) comprising two sidewalls (24) and an open top (23). "Top" as used herein is defined as the portion of the channel or channel segment (26) furthest from the process fluid layer (35), such that the top of a channel may, in FIG. 3, face either up or down on the page (as in channels (46), to be discussed below). As may be seen in FIGS. 3 and 4, each process fluid passage segment (36) has a respective process fluid passage segment centerline (PCL) (indicated on the rightmost two of segments (32) in FIG. 3) defined as a line equidistant from the outermost walls of the segment in the viewing plane, and each open thermal fluid channel or open thermal fluid channel segment (26) has a respective channel or channel segment centerline (CCL1). The open thermal fluid channel or open thermal fluid channel segment (26) are positioned such that the respective channel or channel segment centerlines (CCL1), when viewed in a plan view of the module (12), lie between respective adjacent process fluid passage segment centerlines (PCL).

As may be best seen in FIG. 3, this results, during operation of the fluidic module 12, in the replacement by thermal control fluid (which is present in the thermal control layer 25) of a certain part of the volume of plate 30 generally adjacent to the segments (36). This reduces the thermal conductivity of plate 30 directly between the segments (36) of the process fluid passage (32), even prior to or independent of any flow along the open channels or channel segments (26). With the presence of flow within and along the open channels or channel segments (26), the potential for thermal crosstalk is even further reduced by essentially carrying away the hot spot in the thermal fluid flow itself.

As may be further seen with reference to FIGS. 3 and 4, the fluidic module (12) may further comprise in a surface (48) of the third plate, at least two second-thermal-layer open thermal fluid channels or open thermal fluid channel segments (46), each second-thermal-layer open thermal fluid channel or open thermal fluid channel segment (46) comprising two sidewalls (44) and an open top (43) and having a respective channel or channel segment centerline (CCL2), the respective channel or channel segment centerlines (CCL2) positioned, when viewed in a plan view of the module (12), between respective adjacent process fluid passage segment centerlines (PCL).

Further to FIG. 4, embodiment of the fluid channel segment (36) of FIG. 4 shows that the sidewalls 24 of the fluid channel segment (36), viewed in plan view as in FIG. 4, can be straight, or wavy, or both within the same channel segment 36 as in FIG. 4. Further, wavy sidewalls can have a shape which is complementary, or in other words, contour matched or fitted, to a shape of a respective adjacent process fluid passage segment (36).

Further to FIG. 3, and particularly to the open thermal fluid channels or open thermal fluid channel segments (46) in the surface of the third plate (40) within the second thermal fluid layer (45), these segments (46) illustrate various embodiments of segment cross sections when viewed along the length of the respective segment (46). For example, at least one of the sidewalls (44) can form an angle of 90° with an associated bottom wall (42). Alternatively, at least one of the sidewalls (44) can form an angle of greater than 90° with an associated bottom wall (42). Also, as in the right most three examples of segments (46) in the figure, the sidewalls and bottom wall (42) may follow the contour of the nearest process fluid passage (32) or process fluid passage segment (36). With reference to FIGS. 2-4, different channel cross sections may be used in a single thermal fluid layer or in a single fluidic module, and channel shapes (channel wall shapes), when considered or viewed in a plan view of a fluidic module, may also be used in a single thermal fluid layer or in a single fluidic module.

FIGS. 5-10 are diagrammatic plan views, of the same general perspective as FIG. 2, but showing various aspects of various embodiments of a fluidic module according to the present disclosure, comprising various arrangements of open thermal fluid channels or open thermal fluid channel segments and process fluid passage segments. Dashed circles 52 represent locations of process fluid ports accessing the process fluid passage 32. Solid line circles 54, when present, represent locations of thermal fluid ports accessing first and/or second thermal fluid layers (25,45) with their accompanying open thermal fluid channels or open thermal fluid channel segments (26,46).

Figure 5:
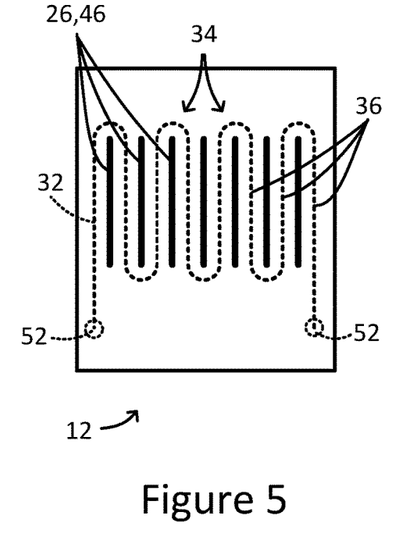
FIGS. 5-10 are diagrammatic plan views, of the same general perspective as FIG. 2, but showing various aspects of various embodiments of a fluidic module according to the present disclosure, including various arrangements of open thermal fluid channels or open thermal fluid channel segments and process fluid passage segments.

With reference to FIG. 5, open thermal fluid channels (26,46) are positioned with their centerlines between each adjacent pair of process fluid passage segments 36, thus reducing or preventing thermal cross-talk between them. In case the depth of the open thermal fluid channels (26,46) plus the depth of the fluid passage (32) in the respective plate between them exceeds the thickness of that plate, it may be desirable to keep the channels (26,46) within the U-bends of the fluid passage (32), as shown.

Figure 6:
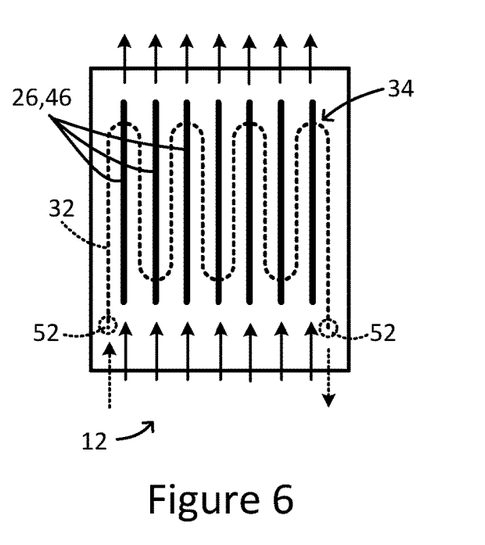

With reference to FIG. 6, if the depth of the open thermal fluid channels (26,46) plus the depth of the fluid passage (32) in the respective plate between them do not exceed the thickness of that plate, or if the channel depth is tapered toward the ends of the channels (26,46) it may be desirable to allow channels (26,46) to extend past the U-bends (34) of the fluid passage (32), as shown.

Figure 7:
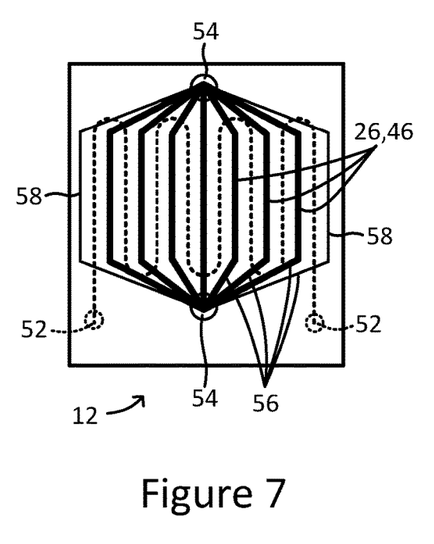

In the embodiment shown in FIG. 7, open thermal fluid channels comprise both 1) open thermal fluid channel segments (26,46) positioned between the process fluid passage segments (36) and 2) feeder and/or collector channels (56) leading from or toward thermal fluid port locations (54). Also present in the embodiment of FIG. 7 are additional or supplemental channels (58) (represented by thinner solid lines). (Line thickness is used here for differentiation only, not to represent relative channel widths or depths or the like.) Supplemental channels serve to decrease thermal cross-talk with the environment surrounding the module (12) and to increase the heat exchange between the process fluid layer (35) and the thermal fluid layers (25, 45).

Figure 8:
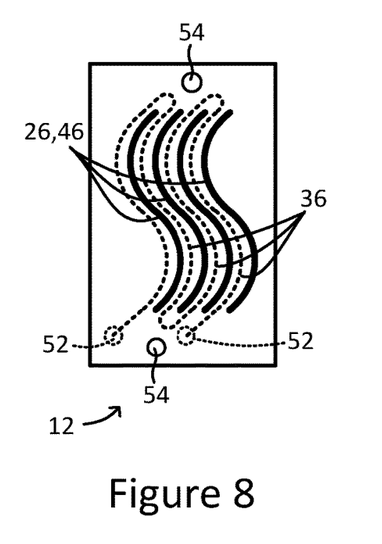

In the embodiment shown in FIG. 8, the process fluid passage segments (36) are not straight, and accordingly, neither are the associated open thermal fluid channels (26, 46).

Figure 9:
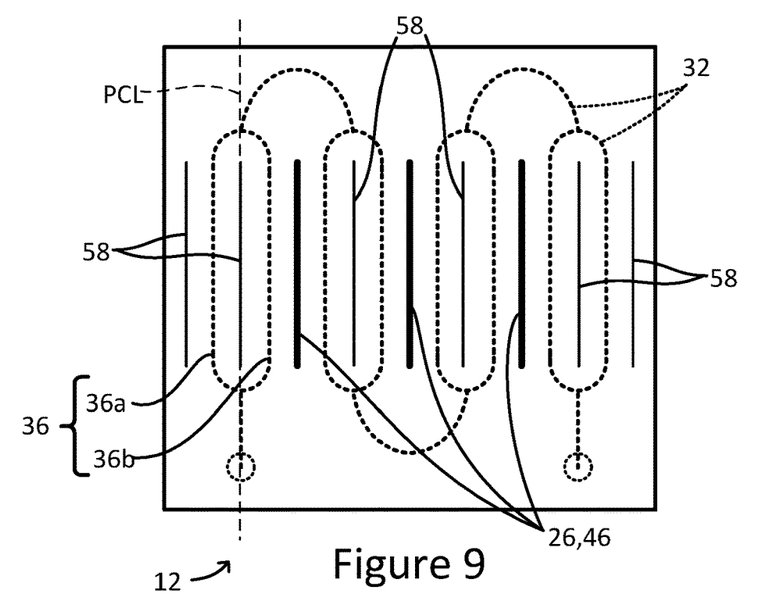

In the embodiment shown in FIG. 9, individual process fluid passage segments (36) are divided into two sub-segments (36a,36b) for parallel flow. In the case of subdivided process fluid passage segments, the process fluid passage segment centerline PCL is defined as the center line of the sub-segments (36a,36b) taken together, as shown near the left side of the figure. In the embodiment shown, open thermal fluid channels (26,46) prevent or reduce cross-talk between opposite-flowing adjacent sections of the process fluid passage (32), while additional or supplemental channels (58) provide increased heat exchange performance between the process fluid layer (35) and the thermal fluid layers (25, 45), thereby further reducing the effects of any remaining cross-talk.

Figure 10:
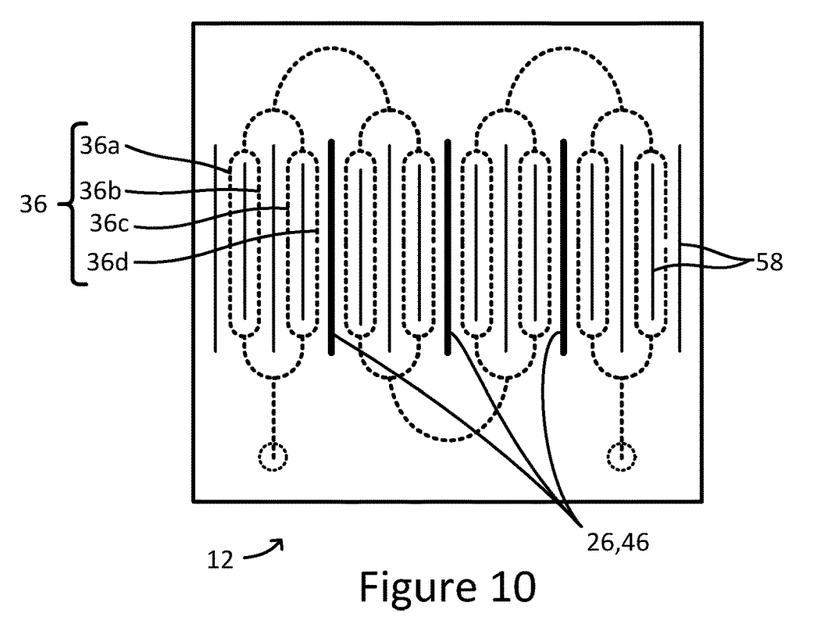

The embodiment of FIG. 10 is similar to that of FIG. 9, except that the individual process fluid passage segments (36) are divided into four sub-segments (36a-36d) for parallel flow.

Figure 11:
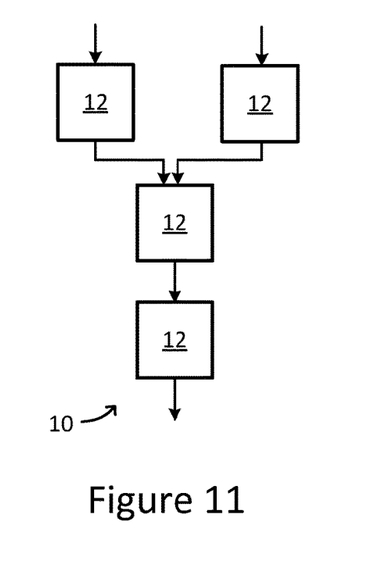
FIG. 11 is a schematic diagram of a thermal cross-talk resistant flow reactor according to an embodiment of the present disclosure.

Embodiments of the present disclosure are particularly well suited for use with process fluid layer plates second and third plates (30,40) which comprise (or consist of) materials having relatively high thermal conductivity, since such materials manifest the tendency to produce detrimental thermal cross-talk. According to embodiments, the second plate (30) can comprise a material having a thermal conductivity of at least 10, at least 15, at least 30, or even at least 60 W/m·K at 20° C. FIG. 11 is a schematic diagram of a reactor (10) comprising two or more modules (12) of the present disclosure fluidically coupled together, constituting a thermal cross-talk resistant flow reactor.

The present embodiments provide a simple but effective solution to avoid or reduce thermal cross-talk between adjacent portions of the process fluid passage (32) located in the same process fluid layer (35). The disclosed solution does not involve additional insulating plates, materials having anisotropic thermal conductivity, or plates made of different materials. It involves providing channels on the external face of the reaction chamber plates such as by machining; when in use, the thermal fluid used in the thermal fluid layer(s) fills in these channels, desirably flows in these channels also, suppressing thermal cross-talk both by its presence and by its flow.

As an additional benefit, the heat exchange area between the plates (30,40) that surround the process fluid layer (35) and the thermal fluid layer(s) is increased by use of the anti-cross-talk channels. The absence and/or significant reduction of thermal cross-talk and the increase of the heat exchange surface can provide one or more of the following benefits 1) minimize the risk for autocatalytic, explosive reactions; 2) prevent or minimizes the boiling of the solvents, which would diminish the utile volume and therefore unfavorably affects the performance of the reactor or would increase the concentration in the liquid phase, which would potentially lead to explosive, so unsafe conditions; 3) conserve the proper conditions in monophase and/or multiphase systems; 4) avoids unwanted precipitation in the endothermic reactions; 5) allows working with higher concentrations which decreases waste and diminishes the cost of downstream processes; 6) decreases the operating costs on the thermal fluid side.

The methods and/or devices disclosed herein are generally useful in performing any process that involves mixing, separation, absorption, distillation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclo-condensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A fluidic module (12) for a flow reactor, the module (12) comprising:
   at least first, second, and third parallel plates (20,30,40) stacked temporarily or permanently together and defining, between the first and second plates, a first thermal fluid layer (25), and, between the second and third plates, a process fluid layer (35);
   within the process fluid layer (35) between the second and third plates (20,30), a process fluid passage (32) having one or more U-bends (34) and three or more successive process fluid passage segments (36), the successive process fluid passage segments (36) joined by respective U-bends (34), each of the three or more successive process fluid passage segments (36) lying adjacent to at least one other of the three or more successive process fluid passage segments (36), each successive process fluid passage segment (36) having a respective process fluid passage segment centerline (PCL);
   in the first thermal fluid layer (25), in a surface (28) of the second plate (30), at least two first-thermal-layer open thermal fluid channels or open thermal fluid channel segments (26), each first-thermal-layer open thermal fluid channel or open thermal fluid channel segment (26) comprising two sidewalls (24) and an open top (23) and having a respective channel or channel segment centerline (CCL1), the respective channel or channel segment centerlines (CCL1) positioned, when viewed in a plan view of the module (12), between respective adjacent process fluid passage segment centerlines (PCL);
   the module further comprising a fourth generally planar and parallel plate (50) stacked temporarily or permanently together against the third plate (40) and defining together with the third plate, between the third and fourth plates, a second thermal fluid layer (45) comprising, in a surface (48) of the third plate, at least two second-thermal-layer open thermal fluid channels or open thermal fluid channel segments (46), each second-thermal-layer open thermal fluid channel or open thermal fluid channel segment (46) comprising two sidewalls (44) and an open top (43) and having a respective channel or channel segment centerline (CCL2), the respective channel or channel segment centerlines (CCL2) positioned, when viewed in a plan view of the module (12), between respective adjacent process fluid passage segment centerlines (PCL).

2. The module (12) according to claim 1, wherein at least one of the open thermal fluid channels or open thermal fluid channel segments (26,46) comprises a straight channel sidewall (24,44).

3. The module according to claim 1, wherein at least one of the open thermal fluid channels or open thermal fluid channel segments (26,46) comprises a wavy channel sidewall (24,44).

4. The module according to claim 3, wherein the wavy channel sidewall (24,44) has a shape complementary to a shape of a respective adjacent process fluid passage segment (36).

5. The module according to claim 1 wherein at least one of the sidewalls (24,44) forms an angle of 90° with an associated bottom wall (22,42).

6. The module according to claim 1 wherein at least one of the sidewalls (24,44) forms an angle of greater than 90° with an associated bottom wall (22,42).

7. The module according to claim 1 wherein the second plate (30) comprises a material having a thermal conductivity of at least 15 W/m·K at 20° C.

8. The module according to claim 1 wherein the second plate (30) comprises a material having a thermal conductivity of at least 20 W/m·K at 20° C.

9. The module according to claim 1 wherein the second plate (30) comprises a material having a thermal conductivity of at least 30 W/m·K at 20° C.

10. The module according to claim 1 wherein the second plate (30) comprises a material having a thermal conductivity of at least 60 W/m·K at 20° C.

11. A reactor (10) comprising two or more modules (12) according to claim 1 fluidically coupled together.

* * * * *

UNITED STATES PATENT AND TRADEMARK OFFICE
CERTIFICATE OF CORRECTION

PATENT NO. : 10,399,058 B2
APPLICATION NO. : 15/580937
DATED : September 3, 2019
INVENTOR(S) : Elena Daniela Lavric et al.

It is certified that error appears in the above-identified patent and that said Letters Patent is hereby corrected as shown below:

On the Title Page

Page 2, Item [56], in Column 2, Line 6, delete "prepatation" and insert -- preparation --, therefor.

Signed and Sealed this
Fourth Day of August, 2020

Andrei Iancu
*Director of the United States Patent and Trademark Office*